(12) United States Patent
May

(10) Patent No.: US 6,776,057 B1
(45) Date of Patent: Aug. 17, 2004

(54) MAGNETIZED TRANSDUCER ELEMENT FOR TORQUE OR FORCE SENSOR

(75) Inventor: Lutz Axel May, Gelting (DE)

(73) Assignee: Abas, Incorporated, Chicago, IL (US)

( * ) Notice: Subject to any disclaimer, the term of this patent is extended or adjusted under 35 U.S.C. 154(b) by 0 days.

(21) Appl. No.: 10/049,323

(22) PCT Filed: Aug. 14, 2000

(86) PCT No.: PCT/GB00/03119

§ 371 (c)(1),
(2), (4) Date: May 14, 2002

(87) PCT Pub. No.: WO01/13081

PCT Pub. Date: Feb. 22, 2001

(30) Foreign Application Priority Data

Aug. 12, 1999 (GB) .............................................. 9919065

(51) Int. Cl.[7] ................................................. G01L 3/02
(52) U.S. Cl. ................................................. 73/862.333
(58) Field of Search ................................... 73/862.333

(56) References Cited

U.S. PATENT DOCUMENTS

| | | | |
|---|---|---|---|
| 4,596,150 A | | 6/1986 | Kuhr ........................... 73/779 |
| 4,805,466 A | | 2/1989 | Schiessle et al. ......... 73/862.36 |
| 5,311,092 A | * | 5/1994 | Fisher ......................... 310/266 |
| 5,444,369 A | * | 8/1995 | Luetzow .................. 324/207.2 |
| 5,520,059 A | * | 5/1996 | Garshelis ............... 73/862.335 |
| 6,532,832 B2 | * | 3/2003 | Shahcheraghi et al. 73/862.333 |

FOREIGN PATENT DOCUMENTS

| | | |
|---|---|---|
| EP | 0 321 662 | 6/1989 |
| WO | WO 99 21151 | 4/1999 |
| WO | WO99 56099 | 11/1999 |

* cited by examiner

*Primary Examiner*—Max Noori
(74) *Attorney, Agent, or Firm*—Blank Rome LLP

(57) ABSTRACT

A magnetic transducer element for use in sensing torque in a contactless transducer system for rotating shaft comprises an annular region of magnetization induced in the shaft by rotating it about its axis with respect to a magnetizing source oriented to create longitudinal magnetization in the annular region. The source may be a U-shaped (horseshoe) magnet with its poles axially spaced and with the gap between the poles substantially greater than the axial width of the poles. The application of torque to the shaft skews the longitudinal magnetization to generate a torque-dependent tangential circumferential field component. This tangential field component is sensed by an external sensor or sensors adjacent but not in contact with the annular transducer region. A pair of transducer regions can be employed as well as guard or keeper regions to enhance and stabilise the transducer region.

12 Claims, 5 Drawing Sheets

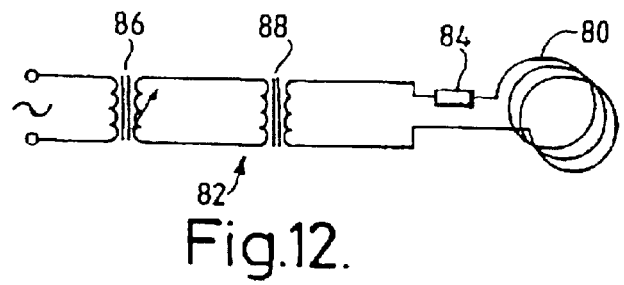
Fig.12.
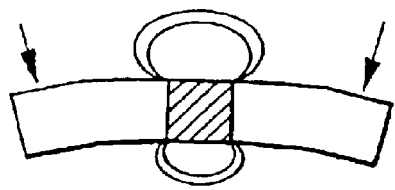 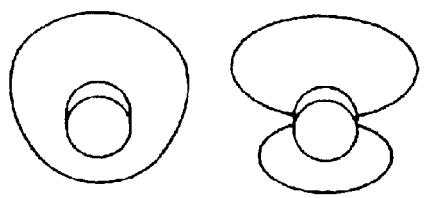
Fig.13.    Fig.13a. Fig.13b.
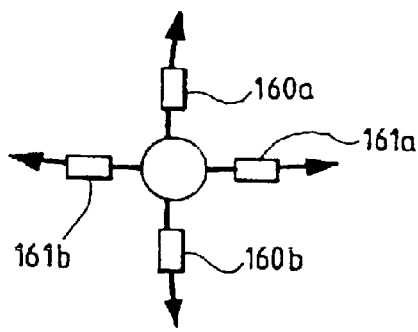
Fig.14.

MAGNETIZED TRANSDUCER ELEMENT FOR TORQUE OR FORCE SENSOR

FIELD OF THE INVENTION

This invention relates to a transducer element suitable for use in a torque or force sensor and to a transducer assembly incorporating the element.

BACKGROUND TO THE INVENTION

One approach to contactless sensing of torque in a shaft rotating about its axis is a torque sensor based on magnetoelasticity. A magnetoelastic transducer element is secured to or integral with the shaft, the torque in which is to be measured, and a torque-dependent magnetic field emanated by the transducer element is detected by a sensing device external to the shaft, but not in contact with the shaft, and responsive to the emanated magnetic field. Examples of sensing devices are a Hall effect device, a saturating coil sensor, or various of other magnetic field sensitive devices known in the art. It will be understood that in practice a sensing device may be an assembly of devices. For example, a plurality of sensing devices may be disposed about the axis of the shaft and interconnected to be additive with respect to the torque-dependent field but to cancel in respect of external fields such as the Earth's magnetic field.

Magnetoelastic transducer elements previously proposed form a ring or annulus which is circumferentially magnetised. The field forms a closed loop normally contained within the element. One form of transducer element is a separate ring of magnetoelastic material attached to the shaft such as disclosed in U.S. Pat. Nos. 5,351,555, 5,465,627 and 5,520,059, all to Garshelis and assigned to Magnetoelastic Devices, Inc. In the ring transducer elements, the ring supports a circumferential magnetic field which is confined within the ring, that is no field is detectable externally in the absence of torque. When torque in the shaft is transmitted to the magnetoelastic ring, an external magnetic field is emanated and is detected by a sensor arrangement.

A different approach to providing a circumferentially magnetised magnetoelastic sensor is disclosed in International Patent Application PCT/GB99/00736 (published on 4th Nov., 1999 under the number WO99/56099) in which the transducer element is an integral portion of the shaft whose torque is to be measured. This avoids problems in securing a separate ring properly to the shaft. An integral transducer element approach is also disclosed in published International Patent Applications WO99/21150 and WO99/21151.

Magnetoelasticity is a phenomenon which, as yet, is apparently still not fully understood and explained. It is, therefore, generally desirable to find other forms of magnetisation that might be employed in transducer elements, particularly suitable for torque sensing.

A disadvantage of torque transducer elements that are circumferentially magnetised is that it is difficult to calibrate the sensor system with respect to short term field variations with temperature or longer term changes of the magnetic field. A transducer element which produces no reliably detectable field under no torque presents a calibration problem.

Reliability and longer term stability are also enhanced in a preferred torque transducer system described in PCT/GB99/00736 (WO99/56099). The shaft is directly magnetised in three or more regions along the axis. Taking the case of three regions, an inner region is circumferentially magnetised with one polarity and it is flanked by respective outer regions magnetised with the opposite polarity of circumferential magnetisation. The inner region provides a transducer element, the two adjacent outer regions acting as guard and keeper regions.

SUMMARY OF THE INVENTION

According to a first aspect of the present invention, one or more magnetic transducer elements are provided integrally in a shaft of magnetisable material but using longitudinal magnetisation, that is a magnetisation that lies in an axial direction in contrast to circumferential magnetisation.

More particularly, the provision of three or more longitudinally magnetised regions having an inner region flanked by two regions of opposite polarity to the inner region enables the inner region to be used as the transducer element while the two flanking regions act as guard or keeper regions for it. More than three regions of alternating polarity may be provided with inner regions acting as transducer elements and as a keeper and guard region for an adjacent inner region. The provision of additional regions as keeper or guard regions help maintain the magnetisation of the transducer element region and isolate it from other fields induced in the shaft, especially where the transducer is used in the presence of strong magnetic fields. These measures to enhance the stability of a longitudinally-magnetised transducer and mitigate the effect of other fields in a shaft on the element need not necessarily employ longitudinal magnetisation for guard region purposes. Non-transducer element guard regions may be circumferentially magnetised with a view to providing a stable magnetic environment within which the transducer element operates.

Present investigations have indicated that the invention can be practised irrespective of whether the material exhibits magnetoelasticity though many materials will do so in any event. It is a feature of the longitudinal magnetisation proposed that a magnetised region will exhibit a fringing field external to the shaft whose direction is a function of torque and which can be used as a reference for calibration purposes. The invention may be practised with a magnetisation that is essentially confined to an annular surface zone of the shaft. The longitudinal magnetisation disclosed herein and discussed below is detected by emanating a torque-dependent field that has a tangential or circumferentially-directed component. This form of magnetisation may be referred to as circumferential sensing, longitudinal magnetisation. The axial or in-line component of the external field, which exists even at zero torque, may be utilised as a reference.

The present invention also includes the concept of measuring the bending force or the shear force in an elongate member subject to a bending or shearing moment.

For convenience all such elongate members, subject to torque, bending and/or shear forces, whether intended for rotation or not, will be referred to as "shafts". The invention will be mainly discussed and described in relation to a shaft rotatable about a longitudinal axis to transmit torque applied to a driven end of the shaft to a load coupled to the other end. However, it will be understood that torque measurement can be required in some circumstances where the load end of the shaft is effectively fixed and forces inducing torque are applied at the other end.

The invention will also be discussed and described in relation to a ferromagnetic shaft of solid circular cross-section. It will be understood from what follows that the shaft may be of other cross-sectional shape as regards its circumference and that non-solid sections may be usable in the practice of the invention. For example, a hollow shaft may be magnetised in the manner to be described provided it has sufficient wall thickness to sustain the desired longitudinal magnetisation.

Aspects and features of the present invention for which protection is sought are set out in the accompanying claims.

BRIEF DESCRIPTION OF THE DRAWINGS

In order that the present invention may be better understood, embodiments of it will now be described with reference to the accompanying drawings, in which:

FIG. 7b shows in cross and axial sections the toroid of magnetic flux established within the region shown in FIG. 7a;

FIG. 12 is a circuit diagram of an apparatus suitable for carrying out a pre-magnetisation and a post-magnetisation procedure;

FIGS. 13, 13a and 13b show the effect of a bending force applied to a shaft; and FIG. 14 shows an arrangement of sensors to detect both an applied torque and a bending force.

DESCRIPTION OF THE PREFERRED EMBODIMENTS

Figure 1:
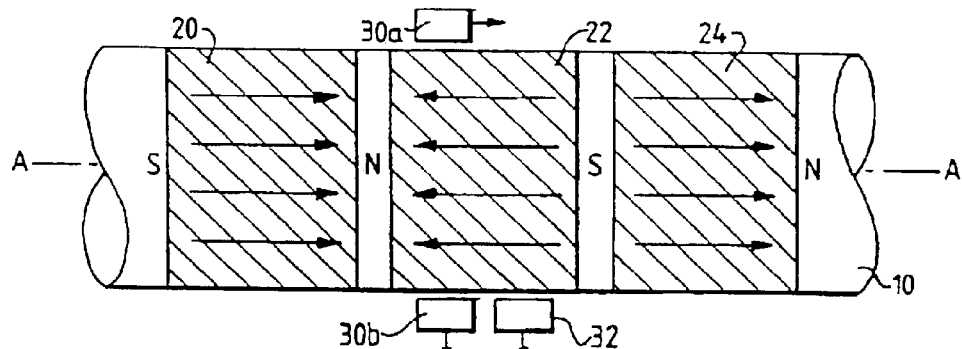
FIG. 1 diagrammatically shows a torque sensor system for a shaft having three longitudinally magnetised regions.

FIG. 1 shows a solid shaft 10 of circular cross-section and of a magnetisable material rotatable about longitudinal axis A—A and having three contiguous or closely adjacent regions 20, 22, 24 that are magnetised in the longitudinal (axial) direction as shown by the arrows. The regions are shaded for clarity of illustration. They are integral portions of the shaft. These regions are magnetised with alternating polarity so that adjacent regions present like poles to one another, e.g. N to N and S to S as indicated. In each region, the magnetisation extends in an annular zone around the shaft circumference. The regions are close enough that the poles exercise a mutual repulsive effect on the flux emanated thereby.

The manner in which the described magnetisation is obtained is discussed further below.

Figure 2A:
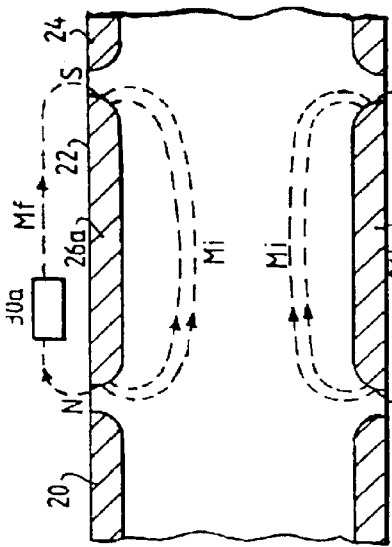
FIGS. 2a and 2b show a transverse and an axial cross-section respectively through the inner region.
Figure 2B:
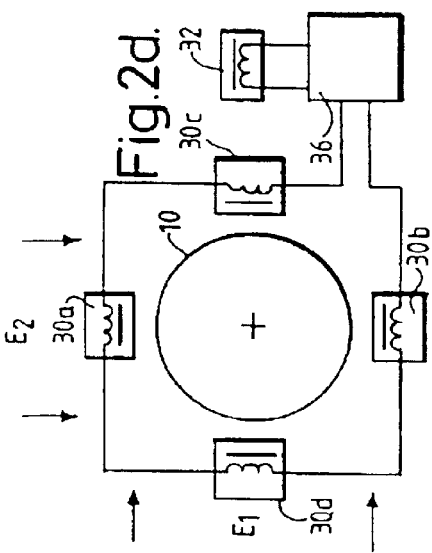

FIG. 2a shows a transverse cross-section through the shaft at the inner of the regions 22 and FIG. 2b shows an axial or diametric section illustrating the magnetisation in that region and the flux generated by it. The nature of the internal magnetisation is discussed more fully below with reference to FIGS. 7a and 7b. FIG. 2a shows diagrammatically that the magnetisation is established predominantly in an annular zone 26 at the surface of the shaft, the magnetisation being in the same axial direction (normal to the plane of the drawing) around the circumference. The depth to which the magnetisation extends depends on the strength of magnetic field employed in magnetisation. Thus the relationship of the radial extent of the annular magnetised zone to the total cross-section of the shaft depends on the diameter of the shaft.

FIG. 2b shows an axial section illustrating that in closing the flux lines associated with zone 26 most of the magnetic flux is going to be internally confined as indicated at Mi within the relatively high permeability shaft material, assuming the shaft is solid or substantially so. A central axial bore through the shaft is of little effect since the axial core material sustains little if any flux. FIG. 2b also shows that some magnetic flux Mf links the poles of zone 26 as an external fringing flux outside the shaft. The exterior is assumed to be a low permeability air path. A tangential component of the fringing flux Mf is detectable when torque is applied by non-contacting sensor devices 30a and 30b placed exterior to the surface of shaft 10. An axially-directed or in-line component is separately detected by sensor 32. Across any diameter, zone 26 will include two portions 26a and 26b, which although magnetised in the same axial direction will result in a different sensor output as is discussed below. As will also be further discussed below, the magnetic field associated with region 22 may be considered as having a toroidal shape coaxial with the axis of rotation A—A.

While a single region 22 of magnetisation could be usable alone, it is preferred to have it flanked by adjacent regions 20 and 24 of opposite polarity where the mutually repulsive effect of like poles assists in forcing the provision of fringing flux Mf from the region 22. The regions 20 and 24 also assist in stabilizing the longer term magnetisation of region 22 and protecting it from fields that may be induced elsewhere along the shaft. The region 22 will hereinafter be referred to as the transducer element or region. The regions 20 and 24 will be referred to as keeper and guard regions. In another embodiment to be described, more than three axially disposed regions of alternating polarity can be employed, where inner regions can serve both as transducer elements and as keeper or guard regions. As already mentioned above the protective or guard functions of regions 20 and 24 may also be realised by having these regions circumferentially magnetised.

Figure 3A:
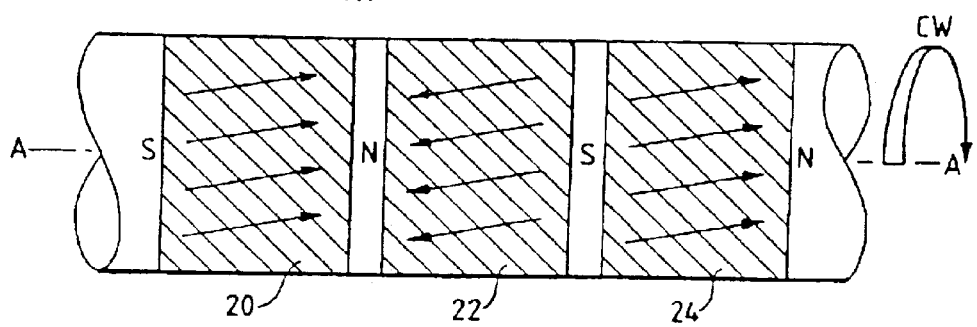
FIGS. 3a and 3b show the shaft of FIG. 1 under torque.
Figure 3B:
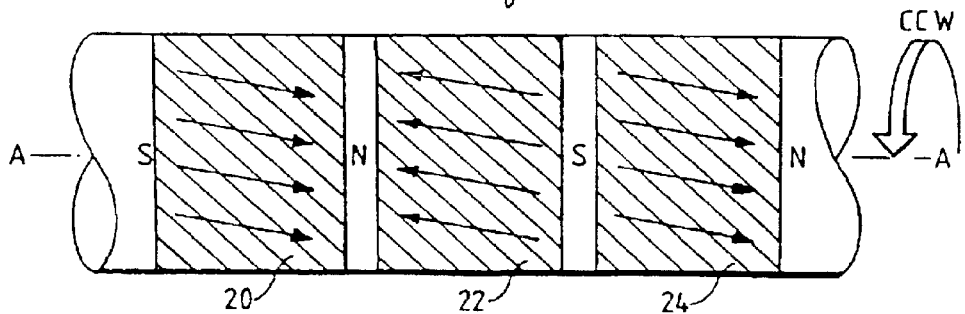

While FIG. 1 shows the shaft 10 under zero-torque, FIGS. 3a and 3b show the shaft when under a clockwise torque (arrow CW) and under a counterclockwise torque (arrow CCW) as seen from the right hand end. The shaft may be rotating, e.g. transmitting load, or static, e.g. fixed at the left hand end. In conjunction with FIGS. 3a and 3b, FIGS. 4a and 4b are vector diagrams of the fringing field Mf from zone portions such as 26a and 26b in FIG. 2b. In the absence of torque in the shaft the field Mf in each zone portion lies parallel to the axis with the same polarity. There is no component of the field in the tangential or circumferential direction.

What is of still more interest is what happens to the field established in the shaft, and more particularly the is detectable field exterior to the shaft under applied torque. Experiments on a Cobalt steel shaft have demonstrated that as the shaft is placed under torque, a circumferentially directed field component Ms is generated by the transducer region, e.g. 22, having a magnitude and direction dependent on the applied torque and its direction. Furthermore, this component is measurable to provide the basis of a torque sensor arrangement. There follows a discussion of the present understanding of external fields created under torque. This explanation takes no account of any magnetoelasticity that the shaft may exhibit. Good results with the practice of this invention have also been obtained with S155 and S156 avionic steels and another high performance steel FV520b, and with a steel alloy known as 14-Cr-Ni.14. Steels having up to 5% Ni have given good results and more particularly with between 1.5 and 5% Ni, preferably 2–4% Ni.

Under torque the shaft itself will be twisted about its axis so that, for example, a line parallel to the axis of rotation A—A drawn along its surface will deflect. Likewise the magnetic field is deflected as illustrated by the arrows in FIGS. 3a and 3b.

Figure 4A:
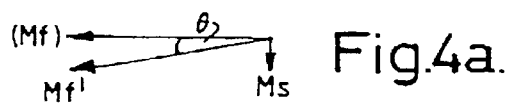
FIGS. 4a and 4b are vector diagrams relating to the external magnetic field of the inner region.
Figure 4B:
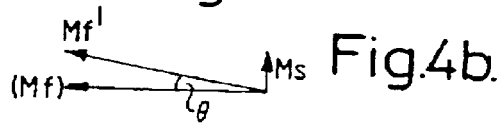

FIG. 4a shows a deflected field vector Mf directed at an angle θ with respect to the no-torque field Mf. (The skew is exaggerated for clarity of illustration.) As can be best explained with present knowledge, the field vector, Mf is resolvable to orthogonal components: component Ms in the circumferential direction, i.e. tangential to the shaft, and an axial component in the direction of zero torque field Mf. The component Ms is both torque dependent and measurable. The same vector diagram applies to any small lengthwise portion of zone 26, when seen from a point perpendicularly above the surface of that portion. FIG. 4b shows the complementary result when the torque is in the opposite direction. The component Ms is now in the opposite direction. However, if the shaft is considered from a fixed point, say perpendicular above zone portion 26a, the vector diagram of FIG. 4a applies for the CW torque but from this perspective the vector diagram of FIG. 4b applies for the diametrically-opposed zone portion 26b. Thus looking at the section of FIG. 2a the components Ms generated in diametrically opposed portions have opposite directions. Advantage can be taken of this in cancelling the influence of an external field is discussed below.

A practical torque sensor requires the transducer element which responds to the torque in the shaft and a sensor device arrangement together with appropriate circuitry for deriving a signal output representative of torque. Many types of sensing device responsive to magnetic fields are known including coils, and particularly saturating inductor devices, Hall effect devices and magnetoresistive devices. For the purposes of implementing the present invention it is preferred to use devices which are sensitive to the direction or orientation of the magnetic field to be measured. More particularly, saturating inductor type devices may be used. An example of such devices and a signal conditioning and processing circuit for use therewith is described in published International Application WO98/52063.

FIG. 1, FIG. 2a and FIG. 2b show a pair of sensing devices of the saturating inductor type, 30a and 30b, which are disposed diametrically opposite one another adjacent the shaft 10, within the axial limited defined by the boundaries of transducer region 22 so as to lie within its fringe field. The axis of response of each sensing device 30a and 30b is aligned with the direction of the circumferential field component Ms. A further sensor device 32 of the same type shown in FIG. 1 is disposed adjacent transducer region 22 but is aligned axially to respond to the fringe field Mf. The sensors are non-contacting with respect to the shaft 10.

Figure 2C:
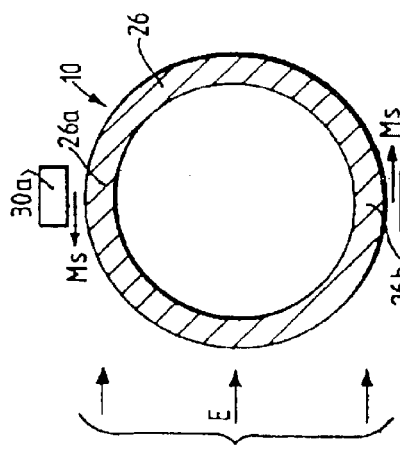
FIGS. 2c and 2d show a circuits for cancelling the effect of an ambient external field.

In FIG. 2a it is seen that looked at from a given direction external to the shaft 10, e.g. from the left in the figure, the respective field components Ms in any two diametrically opposite zone portions such as 26a and 26b are oppositely directed whereas an ambient external magnetic field E, such as the Earth's magnetic field, is in the same direction at both sensing devices. The provision of a pair of oppositely directed sensing devices for the diametrically opposite components Ms can be arranged to add the Ms components while cancelling out an external field such as E. This is illustrated by the circuit of FIG. 2c where the two sensing devices 30a and 30b oriented to align with the Ms components and are connected to processing circuit 36 to add the Ms components while cancelling the external field. It will be appreciated that depending on the type of sensing device and the manner in which individual devices are utilised as regards their signal output, each device may have individual drive/sensing circuitry associated with it, together with signal combining circuitry to obtain the required output.

Torque measurement made by use of a longitudinally magnetised transducer region also provides an additional benefit as compared with the prior published magnetoelastic torque sensors using circumferentially magnetised regions in which the field is confined within the transducer element at zero torque. The fringe field can be detected by means of the separate axially-oriented sensing device 32. This may be a device such as 30a or 30b but oriented perpendicularly thereto in the axial direction. The sensing device 32 provides a signal indicative of the quiescent, no-torque, state of the shaft 10 and provides a reference or calibration value to processing circuit 36 against which to compare the torque-dependent Ms component. Should the magnetisation in the region 22 change, specifically deteriorate over time, the Mf and Ms values will be affected in equal proportion and the Ms value compensated accordingly.

The compensation for external fields described with reference to FIG. 2c can be extended to fields from any direction by the arrangement shown in FIG. 2d.

Figure 2D:
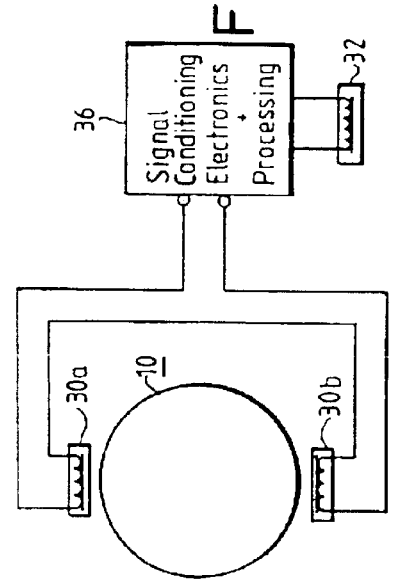

FIG. 2d the pair of sensors 30a and 30b are connected in series with a second pair of sensors 30c and 30d, also arranged on opposite sides of the shaft 10 but disposed orthogonally with respect to the sensors 30a, 30b. The four sensors are connected in series as shown for connection to appropriate processing electronics 36. It will be seen that, as in FIG. 2c, the Ms components in sensors 30a, 30b will add while an external field $E_1$, will be cancelled. Likewise Ms components acting on sensors 30c, 30d will add, and will also add in the series circuit with respect to the Ms components at sensors 30a, 30b. A field $E_2$ orthogonal to $E_1$ will be cancelled in the sensors 30c, 30d. An external field from any direction will cancel, as it can be considered as comprising orthogonal components in the $E_1$ and $E_2$ directions.

Figure 5:
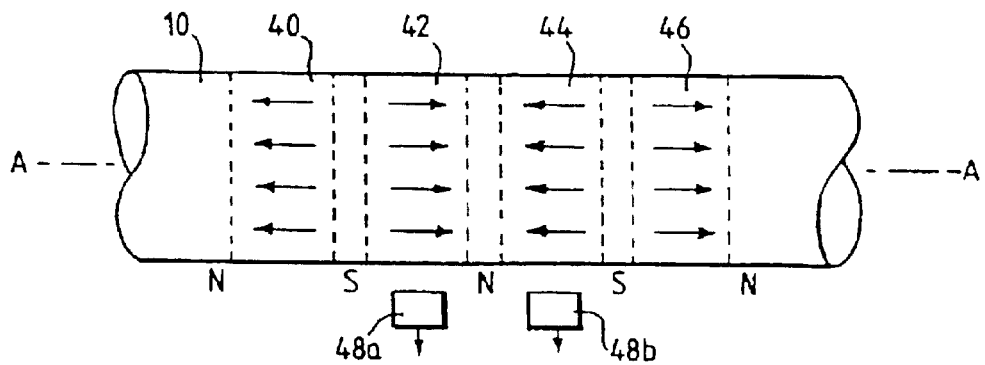
FIG. 5 shows a modification in which the shaft has four longitudinally magnetised regions.

There are two further developments of the sensor system thus far described. One is the use of more than three adjacent magnetised regions. FIG. 5 shows four such regions 40, 42, 44, 46 along the shaft axis with neighbouring regions closely adjacent. The four regions are longitudinally magnetised with alternating polarity. In this embodiment, the two inner regions 42, 44 are used as transducer elements being provided with respective sensing devices 48a and 48b (which may be diametrically opposite pairs as already described) located within the axial limit set by the boundaries of the respective regions. It is seen that the exterior regions 40 and 46 act as guard/keeper regions while inner transducer regions 42, 44 also act as respective guard keeper/guard regions for one another. The sensing devices 48a, 48b are oriented transversely with respect to the axis, i.e. comparable to FIG. 2a, so as to respond to the Ms components.

One application of two inner transducer elements of opposite polarity in cancelling out the effect of an external field, is where access to the external field $M_f$ may be practicable only on one side of the shaft. In this case the devices 48a, 48b on the same side of the shaft will be subject to Ms components of opposite polarity from regions 42 and 44 when the shaft is under torque. However, an ambient field such as the Earth's field is in the same direction at both. Thus by analogy to FIGS. 2a and 2c, the Ms components can be added while cancelling the ambient components. If room permits, an orthogonal arrangement such as in FIG. 2d can be employed.

Attention will now be given to the manner in which a shaft is magnetised for the circumferential-sensing longitudinal magnetisation discussed above.

In order to achieve optimum transducer performance in terms of consistent and repeatable measurements, it is first desirable to subject the shaft, or at least that part of it relevant to the region or regions to be magnetised, to a pre-magnetisation process by which the shaft is magnetically cleansed. One form of apparatus suitable for magnetic cleansing is shown in FIG. 12. The pre-magnetisation process to be described is applicable to a shaft or other sensor host in which the required magnetised regions are to be formed. The process to be described will demagnetise or de-gauss a shaft in which unknown magnetic field patterns may have been established.

The shaft as received may have been subject to various mechanical and/or heat treatment operations which differentially affect the magnetic domains within the material. It may have been subject to and have acquired undefined magnetic fields. Such unknowns will be deleterious to transducer performance. Thus in most cases the shaft is to be put through a pre-magnetisation procedure to put it into a magnetically-defined state which has been referred to above as magnetically cleansed.

The degree of demagnetisation required is partially dependent on the magnetisation to be applied thereafter. For example if the magnetic programming to create the transducer element uses a relatively low level of magnetic field strength, the more important it becomes to completely demagnetise the sensor host. In this context magnetic cleansing means that the de-gaussing or demagnetisation procedure results in that the magnetic direction of the individual grains of the shaft material is random so that no grouping of magnetic domains in any particular direction exists. The existence of magnetic domain grouping to provide some organised magnetic orientation of individual grains leads to deficiencies in the magnetised transducer element. For example, increased offsets of the measured magnetic signal; non-uniformity of the signal as a function of the rotational angle of the shaft; and lower stability overtime of the transducer element.

The magnetic cleansing should extend well beyond the region at which the magnetised transducer element is to be formed, e.g. preferably the whole shaft should be demagnetised so that there are no undefined local magnet systems in the sensor host. In particular "bar-magnet" formations parallel to the shaft axis may travel over time within the shaft to affect the sensor specification on an ongoing basis. The guard fields provide a measure to mitigate this possibility if such fields remain even despite magnetic cleansing.

FIG. 12 illustrates an apparatus for magnetic cleansing. It comprises a demagnetising coil 80 would in hollow solenoid: fashion, a mains powered transformer arrangement 82 and a current limiter 84. For an 18 mm. diameter shaft a suitable coil was about 300 turns oft about 30 cm. diameter of a heavy current carrying capacity cable. The outer conductor of a heavy coaxial cable coiled into a solenoid coil proved to be suitable. The transformer arrangement 82 comprises a variable transformer 86 connected to a 110 or 240 VAC mains AC supply. This is in turn connected to an isolation transformer 88 capable of safely delivering 10 amperes or more at its secondary at voltages at up to say 48V. The coil 80 is connected to the secondary of transformer 88 through the current limiter 84 which may be a resistor, e.g. a power rheostat, or more elaborate electronic device. The current limiter may be omitted provided steps are taken to monitor the current through the coil. A typical coil resistance would be about 100 milliohms. The variability of the transformer arrangement enables the current to be controlled as desired.

The coil 80 is energised and the full length of the shaft is passed through the coil while the coil is energised at 8–10A. This produces a de-gaussing field of about 1 kGauss. Typically one is looking to achieve fields in the 500–1200 Gauss range. The shaft may be mounted on a movable jig to move it along the axis of the coil and the movement continues as the far end of the shaft leaves the coil so that the field to which the shaft is subjected gradually decreases. There may be other ways of achieving the de-gaussing procedure including control of the coil current as a function of the axial position of the shaft with respect to the coil.

This pre-magnetisation is considered to have more general applicability to a wide range of sensor host shapes (shafts, discs etc.) and to a wide range of magnetic transducer types, including circumferentially-magnetised.

Following the magnetisation procedure to be described a post-magnetisation step may be performed in the same manner as the pre-magnetisation procedure but at a lower level of magnetic field. This step may also be applied more generally to stabilise sensor hosts magnetised in other ways such as set out above.

In the post-magnetisation procedure, the now magnetised shaft is again passed axially through the energised solenoid coil 80. However, the AC current through the coil is of an order of a magnitude lower than for the pre-magnetisation procedure. In the pre-magnetisation example given above, the 8–10A current employed for pre-magnetisation is reduced to say 0.5–1A for post magnetisation. The current is at a value which does not change the basic magnetic pattern sought to be established but, as best can be surmised, it reduces or knocks-back parasitic fields that may be present after the magnetisation procedure. It has been found that the post-magnetisation step improves the uniformity of the output signal with rotation of the shaft, offsets over time and the final sensor stability generally.

Returning to the magnetisation procedure to establish the longitudinally magnetised region(s) in shaft 10, this will now be discussed in greater detail.

Figure 6:
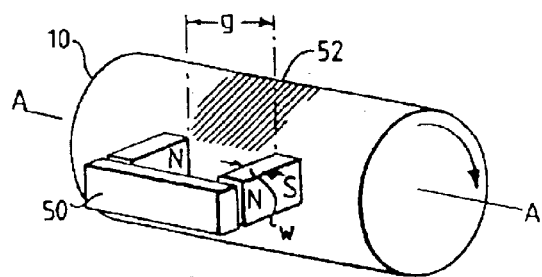
FIG. 6 shows a magnet arrangement for magnetising the shaft regions.

The magnetisation of each longitudinally magnetised region can be done as shown in FIG. 6 with what amounts to a horseshoe or U-shape magnet 50 of sufficient power. The magnet pole faces facing the shaft can be made concave to better conform to the shaft. The magnet 50 can be realised with permanent magnets or an electromagnet. The latter has the advantage of providing greater control over the strength of the magnetising field. To obtain longitudinal magnetisation over an annular zone around the shaft 10, magnet and the shaft are rotated relative to one another about the axis A—A of the shaft. The magnetisation is performed with a field strength sufficient to saturate at least the surface zone of the material as indicated at 52 so that the material is left with a magnetisation equal to its remanence value. The magnetisation need not extend too deeply since the fringing flux external to the shaft will be predominantly generated from near the surface. However, a deeper magnetisation may be beneficial in obtaining output signals with a minimum of noise.

The obtaining of the circumferential-sensing longitudinal magnetisation discussed above has been found to be dependent on the dimensions of magnet 50. The magnet structure can comprise two strongly magnetised pole pieces 54a and 54b having respective ends located closely adjacent the shaft and their distal ends magnetically joined by a low reluctance member 56 forming the base of the U-shape. The member 56 acts as a flux enhancer to increase the flux between the pole ends that enter the shaft 10. The pole pieces 54a and 54b have the same dimensions each having an axial width w—that is the width in the direction of the axis of the shaft—and an axial gap g between the poles that is substantially greater than width w. For example, satisfactory performance has been achieved with g/w≈3. In an embodiment that has been tested, the pole pieces each had a cross-section of 10×3 mm. and were oriented to have the 3 mm. dimension in the axial (w) direction, the 10 mm. dimension being in the tangential direction. The gap 20 g was 10 mm. The annular magnetisation induced in the shaft by this arrangement produces a predominant magnetisation adjacent the poles of magnet 50. The flux generated by the poles is less effective in the gap region though a flux path is established in the axial direction throughout the zone 52 as will be further discussed with reference to FIGS. 7 and 8.

Figure 6A:
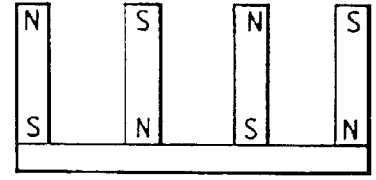
FIG. 6a shows an arrangement for magnetising three regions simultaneously.

FIG. 6a shows a development of the magnet 6 to allow a number of regions to be magnetised simultaneously with alternating polarity of magnetisation. As shown in FIG. 6a the magnet structure enables a common magnet leg to be used jointly for two adjacent magnets. FIG. 6a shows a structure specifically for magnetising three regions simultaneously.

Figure 7A:
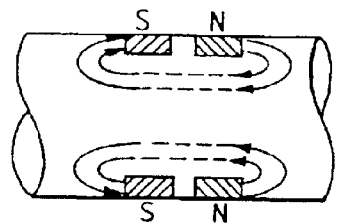
FIG. 7a illustrates the magnetic flux associated with a longitudinally magnetised region by way of explanation.
Figure 7B:
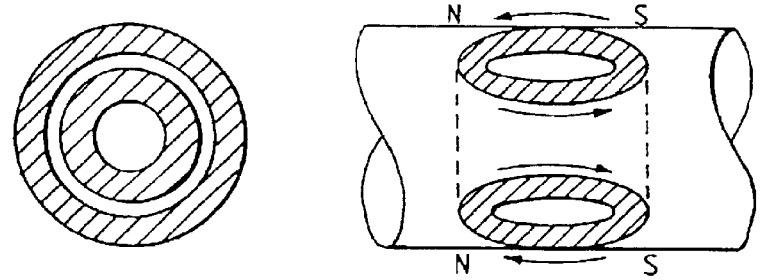

FIG. 7a illustrates a surface adjacent annular zone such as 22 indicated in. FIG. 2a, in a region 52 longitudinally magnetised as already described with reference to FIG. 6. FIG. 7a shows the annular zone represented in any diametric axial cross-section as magnets NS in which the flux generated in zone 22 in a S-N is predominantly closed by a path within the interior of the material. The exterior fringing flux is not shown here. According to this explanation it is reasoned that the flux will exist as a toroid of flux lines as shown in FIG. 7b, the cross-section at the left indicating flux in the opposite directions by different shadings.

Figure 8A:
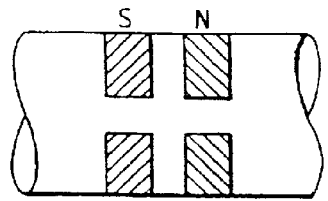
FIG. 8a and FIG. 8b illustrate a two-phase magnetisation procedure for obtaining an annular zone of magnetisation within a deeper region of magnetisation.

The flux pattern illustrated in FIG. 7a may be referred to as a one or single phase magnetisation. It may be desirable, for greater certainty and control of measurement, to undertake a two phase magnetisation procedure in which the state of magnetisation of the cross-section of the shaft is better defined. This is illustrated in FIG. 8a which shows a first phase of deeper magnetisation of the shaft to produce a given axial polarity of magnetisation.

Figure 8B:
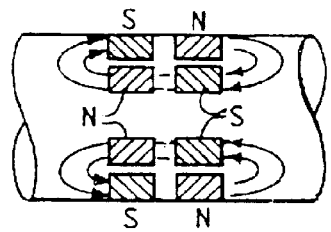

The deeper magnetisation requires a stronger applied magnetic field so as to leave a greater depth of material with remanent magnetisation. A second phase of magnetisation is then undertaken by applying a magnetic field of opposite polarity to that of the first phase and whose strength is chosen so as to leave an outer annular zone of one polarity and an inner annular zone of opposite polarity located radially inwardly of the outer zone as illustrated in FIG. 8b. The two annular zones close their magnetic flux paths through one another, aiding in achieving a stable, well defined magnetic state. The magnetic flux lines again define a toroid within the shaft. A stable well-defined external fringing flux will be established.

The explanation given above applies generally to magnetisable materials. However, it will be recognised that the performance of magnetic materials to achieve the desired results will vary.

The permeability, remanence and, particularly for two phase magnetisation, coercivity of the material are all relevant. Satisfactory experimental results have been achieved with steels containing a percentage of Nickel, and if possible also cobalt. In practical situations, the design of and choice of materials for a torque transmitting shaft may largely depend upon other mechanical engineering operating environmental considerations.

Figure 9:
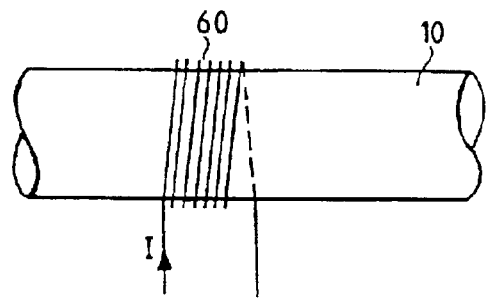
FIG. 9 shows another magnetising arrangement for the shaft using an axially-extending coil within which the shaft to be magnetised is located.

FIG. 9 illustrates another magnetising arrangement which may be used to magnetise a shaft in a single or a two phase manner. In FIG. 9 the shaft 10 is enclosed by a coil 60 coaxial with the shaft in the manner of a solenoid coil. The coil will have an axial dimension appropriate to the axial length of the region to be magnetised. Energising the coil from a current source (I) generates a longitudinal magnetic field to longitudinally magnetise the region within the coil, the polarity of the current in the coil determining the polarity of the magnetisation.

The depth of magnetisation is controllable by controlling the strength of the current I. This control can be exercised to perform two phase magnetisation. For example a coil for magnetising a steel shaft in accord with FIG. 8a was energised with a direct current of 20A for the first phase and a current of opposite polarity of 5A for the second phase.

Figure 10:
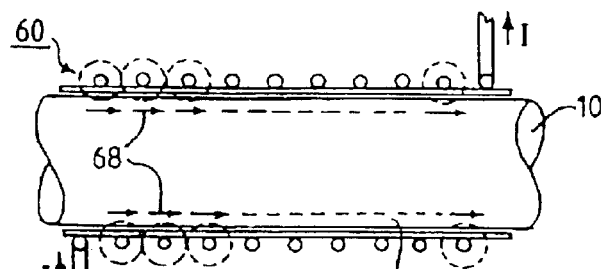
FIG. 10 shows fields generated by the coil of FIG. 9 to obtain the two-phase magnetisation of FIGS. 8a and 8b.

The action of the magnetic field generated by the coil 60 on the material of the shaft can be better appreciated from the diagram of FIG. 10 which shows an axial cross-section. The shaft 10 has the portion 22' of it to be magnetised received within a close fitting former 62 on which the coil is wound, that is the coil inside diameter closely matches the shaft diameter. FIG. 10 illustrates the magnetic field 66 associated with individual coil turns 64 (it is only shown for some turns). The individual field components combine at and adjacent the surface of the portion 22' as indicated by arrows 68 to produce a longitudinal magnetisation of the surface zone. The depth to which this zone extends depends on the current applied to the coil 60. Thus in achieving the magnetisation of FIG. 8a a large current pulse of one polarity is initially applied and to achieve a second phase of magnetisation as in FIG. 8b a smaller current pulse of the opposite polarity is applied. It is to be noted that the current pulses need be of only short duration.

A coil coaxial about the shaft can also be used as a sensor coil. In this case the coil may be the same as that used to magnetise the shaft, but preferable is one of much finer gauge wire than is required to carry a magnetising current.

The present invention may also be employed to measure other forces, such as measurement of a bending force, or of shear force imposed in a load bearing structure. A force such as a bending or shear force will result in a distortion of the magnetic field around the shaft.

Figure 11:
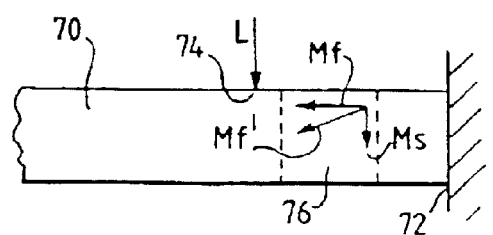
FIG. 11 shows how the invention is applicable to shear force measurement.

FIG. 11 shows a member 70 secured at a point 72 along its length and supporting a load L at another point 74. The member 70 is longitudinally magnetised to provide a transducer region 76 in the manner of region 22 described above. The region 76 is located so as to be responsive to the shear forces. Shear forces generated in the region 22 will tend to cause a deflection of the direction of the magnetic field Mf creating transverse component Ms as a measure of the force acting on the member 70.

Another example is shown in FIG. 13, a bending force may act to stretch the upper part of the shaft and compress the lower part of the shaft, resulting in a non-uniform fringe flux, for example as shown in FIGS. 14a and 14b. By use of appropriately positioned sensors, variations in the magnetic field can be measured, and from this a determination of the applied forces made. For example, if a bending force in one direction is to be determined, two sensors will be required in this direction. Three or more sensors will be required to determine a bending force in two directions.

As shown in FIG. 14, if four magnetic field sensors 160a, 160b, 161a, 161b are used, averaging the magnetic flux measured by the four sensors will determine the applied torque, and the difference between the measured flux of sensors 160a and 160b and sensors 161a and 161b can be used to determine the vertical and horizontal bending forces respectively.

What is claimed is:

1. A transducer for a torque or force transducer comprising a member having a region of magnetisable material to be subject to an applied stress due to torque or force said region including first and second zones that are annular about an axis with said second zone located radially inward of said first zone, one of said zone having a permanent magnetisation that is longitudinally oriented in the direction of said axis and the other zone providing a return flux path for flux generated by said one zone, said one zone generating a magnetic field exteriorly of said region which has a magnetic field component in a circumferential direction with respect to said axis that is a function of the applied stress and said other zone having a permanent magnetisation that is longitudinally oriented in the direction of said axis and that is of opposite polarity to the longitudinally magnetisation of said one zone.

2. A transducer element as claimed in claim 1 in which the exterior magnetic field generated by said one zone has a component in the axial direction usable as a reference.

3. A transducer element as claimed in claim 1 in which said one zone extends to an annular surface of said member.

4. A transducer comprising a transducer element as claimed in claim 2, further comprising a first magnetic field sensor arrangement responsive to said circumferential magnetic field component to provide a first signal representing said applied stress, and a second magnetic field sensor arrangement responsive to said axial direction exterior component to provide a second, reference, signal, and signal processing means responsive to said first and second signals to produce, with reference to said second signal, an output signal representing said applied stress.

5. A transducer element as claimed in claim 1 in which said first and second zones constitute said one and other zones respectively.

6. A transducer element as claimed in claim 1 further comprising at least one further region of magnetic material adjacent the first-mentioned region, the or each further region including an annular zone of permanent magnetisation.

7. A transducer element as claimed in claim 6 in which said annular zone of the or each further region is longitudinally magnetised with a magnetisation of opposite polarity to said one zone.

8. A transducer element as claimed in claim 1 in which said member is adapted to have torque applied thereto about said axis such that the circumferential magnetic field component is a function of torque.

9. A transducer element as claimed in claim 8 in which said member is a cylindrical body, preferably circular cylindrical, mounted for having torque applied about its longitudinal axis.

10. A transducer comprising a transducer element as claimed in claim 1 and at least one magnetic field sensor device disposed and oriented to detect the circumferential magnetic field component and provide a signal representing same.

11. A transducer as claimed in claim 10 further comprising at least one further magnetic field sensor device disposed and oriented to detect an exterior longitudinal field component generated by said one zone, said at least one further magnetic field sensor device providing a signal representing said longitudinal magnetic field component.

12. A transducer as claimed in claim 11 comprising a signal processing circuit responsive to the respective signals representing the circumferential magnetic field component and the longitudinal magnetic field component to produce an output signal representing the circumferential field component referred to the longitudinal field component.

* * * * *